US008681062B2

(12) United States Patent
Itoh et al.

(10) Patent No.: US 8,681,062 B2
(45) Date of Patent: Mar. 25, 2014

(54) ANTENNA, WIRELESS COMMUNICATION APPARATUS AND METHOD OF CONFIGURING ANTENNA

(75) Inventors: Ryoh Itoh, Minato-ku (JP); Jun Uchida, Kakegawa (JP)

(73) Assignee: NEC Corporation, Tokyo (JP)

( * ) Notice: Subject to any disclaimer, the term of this patent is extended or adjusted under 35 U.S.C. 154(b) by 180 days.

(21) Appl. No.: 13/496,789

(22) PCT Filed: Sep. 14, 2010

(86) PCT No.: PCT/JP2010/066274
§ 371 (c)(1),
(2), (4) Date: Mar. 16, 2012

(87) PCT Pub. No.: WO2011/034197
PCT Pub. Date: Mar. 24, 2011

(65) Prior Publication Data
US 2012/0176293 A1    Jul. 12, 2012

(30) Foreign Application Priority Data

Sep. 17, 2009  (JP) ................................. 2009-215824

(51) Int. Cl.
*H01Q 1/24* (2006.01)
*H01Q 1/48* (2006.01)

(52) U.S. Cl.
USPC ............................ 343/702; 343/846; 343/848

(58) Field of Classification Search
USPC ......................................... 343/702, 846, 848
See application file for complete search history.

(56) References Cited

U.S. PATENT DOCUMENTS 7,102,578 B2 *  9/2006 Minemura ..................... 343/702
(Continued)

FOREIGN PATENT DOCUMENTS

JP        8-186420 A     7/1996
JP     2004-40596 A     2/2004
(Continued)

*Primary Examiner* — Hoang V Nguyen
(74) *Attorney, Agent, or Firm* — Sughrue Mion, PLLC

(57) ABSTRACT

The present invention enables to restrain the enlargement of the wireless communication apparatus and prevent the manufacturing processes from increasing and to increase the frequency bands which can be used by the wireless communication.

An antenna 1 includes a first ground pattern 3, a second ground pattern 4, a hinge conductor member 5 and a current control circuit 6. The first ground pattern 3 is formed on a first printed wiring board 7. The hinge conductor member 5 is arranged on a hinge Z which connects indirectly the first printed wiring board 7 and a second printed wiring board 8 each other. The current control circuit 6 is arranged on the first printed wiring board 7. The current control circuit 6 has a function to flow the electric current of a first frequency band and attenuate the electric current of a second frequency band. An electric current of the first frequency band flows from a feeding source 10 to the second ground pattern 4 and flows into the first ground pattern 3 through the hinge conductor member 5 and the current control circuit 6. A part, on which the electric current of the first frequency band flows, functions as an antenna which communicate the signal of the first frequency band. An electric current of the second frequency band flows from the feeding source 10 to the second ground pattern 4 and flows until reaching the current control circuit 6 through the hinge conductor member 5. A part, on which the electric current of the second frequency band flows, functions as an antenna which communicate the signal of the second frequency band.

11 Claims, 13 Drawing Sheets

(56) References Cited

U.S. PATENT DOCUMENTS

| | | | |
|---|---|---|---|
| 7,199,762 B2 * | 4/2007 | Liu et al. | 343/702 |
| 7,456,794 B2 * | 11/2008 | Sakamoto et al. | 343/702 |
| 7,787,915 B2 * | 8/2010 | Uejima et al. | 455/575.3 |
| 2007/0164913 A1 | 7/2007 | Sakamoto et al. | |

FOREIGN PATENT DOCUMENTS

| | | |
|---|---|---|
| JP | 2005-45646 A | 2/2005 |
| JP | 2007-74366 A | 3/2007 |
| JP | 2009-147513 A | 7/2009 |
| WO | 2006/046712 A1 | 5/2006 |

* cited by examiner

ANTENNA, WIRELESS COMMUNICATION APPARATUS AND METHOD OF CONFIGURING ANTENNA

CROSS REFERENCE TO RELATED APPLICATIONS

This application is a National Stage of International Application No. PCT/JP2010/066274, filed on Sep. 14, 2010, which claims priority from Japanese Patent Application No. 2009-215824, filed on Sep. 17, 2009, the contents of all of which are incorporated herein by reference in their entirety.

TECHNICAL FIELD

The present invention relates to an antenna, a wireless communication apparatus and a method of configuring an antenna which are able to communicate a signal in a plurality of frequency bands by wireless.

BACKGROUND ART

FIG. 12A shows a schematic example of an antenna (refer to a patent literature 1). An antenna 100 is mounted on a folding type (clamshell type) cellular phone. The antenna 100 includes an upper side printed wiring board 101, an impedance element 102, a hinge 103, a lower side printed wiring board 104 and an impedance element 105.

The hinge 103 includes a mechanism to connect an upper side case 107 and a lower side case 108 of the cellular phone each other. Furthermore, the hinge 103 includes a metallic component 103a which is made of metal such as stainless steel.

An electric circuit (not shown in the figure) and a ground pattern (not shown in the figure), which functions as the ground of the electric circuit, are formed on the upper side printed wiring board 101. The upper side printed wiring board 101 is arranged within the upper side case 107.

The impedance element 102 is a circuit element which is arranged on the upper side printed wiring board 101. The impedance element 102 includes a resonant circuit 111 shown in FIG. 12B. One of both end parts 111a and 111b in the resonant circuit 111 connects with the ground pattern of the upper side printed wiring board 101. The other of both end parts 111a and 111b connects electrically with the metallic component 103a of the hinge 103 through a connection member 113 shown in FIG. 12A.

An electric circuit (not shown in the figure) and a ground pattern (not shown in the figure), which functions as the ground of the electric circuit, are formed on the lower side printed wiring board 104 similarly to the upper side printed wiring board 101. The lower side printed wiring board 104 is arranged within the lower side case 108. The impedance element 105 is a circuit element which is arranged on the lower side printed wiring board 104. The impedance element 105 includes the same resonant circuit 111 as the impedance element 102 includes. One of both end parts 111a and 111b in the resonant circuit 111 connects with the ground pattern of the lower side printed wiring board 104, and the other connects electrically with the metallic component 103a of the hinge 103 through a connection member 114.

According to the antenna 100, as mentioned above, the ground patterns of the printed wiring boards 101 and 104, the resonant circuits 111, which are included in the impedance elements 102 and 105, the metallic component 103a of the hinge 103 and the connection members 113 and 114 connect electrically each other. These connected components function as a dipole antenna 106.

By the way, the cellular phone is equipped with an antenna 110 in addition to the dipole antenna 106. The dipole antenna 106 functions, for example, as an antenna which receives a radio wave of the ground digital television broadcasting. The antenna 110 has a function to send and receive a radio wave of a frequency band (wireless communication frequency band) which is arranged in order to communicate with a base station by wireless.

According to the patent literature 1 (Japanese Patent Application Laid-Open No. 2009-147513), the impedance elements 102 and 105 have a function to prevent the dipole antenna 106 from causing a harmful influence on the antenna 110. That is, in the case that the dipole antenna 106 (each ground pattern of the printed wiring boards 101 and 104) resonates in the wireless communication frequency band, this resonance causes the harmful influence on the wireless communication between the base station and the antenna 110. According to the patent literature 1, to cope with the above-mentioned situation, the impedance elements 102 and 105 have a function to restrain that a electric current, whose frequency spectrum is in the wireless communication frequency band, flows (is induced) on the ground patterns of the printed wiring boards 101 and 104. Here, the electric current, whose frequency spectrum is in the wireless communication frequency band, may be denoted hereinafter as a base station communication current Ibe.

That is, the resonant circuit 111, which is included in the impedance elements 102 and 105, has a circuit 115 which becomes an open circuit for the base station communication current Ibe. For this reason, the impedance elements 102 and 105 attenuate the base station communication current Ibe. As a result, the impedance elements 102 and 105 prevent the ground patterns of the printed wiring boards 101 and 104 from resonating in the frequency band, which communicates with the base station by wireless, due to the base station communication current Ibe flowing. The above-mentioned function of the impedance elements 102 and 105 restrains the harmful influence, which is caused by the dipole antenna 106, on the antenna 110.

Here, the resonant circuit 111 furthermore includes a circuit 116 in addition to the circuit 115. The circuit 116 is designed so that the resonant circuit 111 may become a short circuit for an electric current of a frequency band to be assigned to the ground digital television broadcasting. As a result, the electric current, whose frequency spectrum is in the radio frequency band of the ground digital television broadcasting, is not attenuated by the resonant circuit 111, and then flows into the dipole antenna 106 (the ground patterns of the printed wiring boards 101 and 104, the impedance elements 102 and 105, the metallic component 103a of the hinge 103, and the connection members 113 and 114). For this reason, the dipole antenna 106 can function as the antenna which receives the radio wave of the ground digital television broadcasting.

For example, a radio frequency band of the ground digital television broadcasting is 470 MHz to 770 MHz. A radio frequency band of the wireless communication with the base station is 1920 MHz to 2170 MHz.

FIG. 13A shows a schematic example of another antenna (refer to a patent literature 2 (Japanese Patent Application Laid-Open No. 1996(H08)-186420)). An antenna 120 includes a ground substrate 121, a dielectric substrate 122 and a monopole element 123. The dielectric substrate 122, which is used only for the antenna, is arranged so as to be vertical to the ground substrate 121. The monopole element 123 is formed on the dielectric substrate 122. The monopole element 123 includes a first antenna element 124, a second antenna element 125 and a resonant circuit 126. The first antenna element 124 and the second antenna element 125 are printed on the dielectric substrate 122. One end 124a of the first antenna element 124 connects electrically with a feeding source 128. The other end 124b of the first antenna element 124 connects electrically with the second antenna element 125 through the resonant circuit 126. Length L1 of the first antenna element 124 is designed so that the first antenna element 124 may resonate at a second frequency F2. Moreover, length L3 (L3=L1+L2), which is corresponding to total length of the first antenna element 124 and the second antenna element 125, is designed so that a whole of the monopole element 123 may resonate at a first frequency F1 which is lower than the second frequency F2.

The resonant circuit 126 is, for example, a parallel resonant circuit shown in FIG. 13B. The resonant circuit 126 is formed on the dielectric substrate 122. One end 126a of the resonant circuit 126 connects with the other end 124b of the first antenna element 124, and the other end 126b of the resonant circuit 126 connects with the second antenna element 125. The resonant circuit 126 is configured so as to become an open circuit for a electric current of the second frequency F2. For this reason, the resonant circuit 126 attenuates the electric current of the second frequency F2.

According to the antenna 120, the electric current having the second frequency F2, which is fed by the feeding source 128, is attenuated by the resonant circuit 126. For this reason, it is restrained that the electric current having the second frequency F2 flows from the first antenna element 124 to the second antenna element 125. Consequently, the electric current having the second frequency F2 flows only into the first antenna element 124 out of the first antenna element 124 and the second antenna element 125. As a result, the monopole element 123 (in this case, the first antenna element 124) resonates at the second frequency F2, and a signal having the second frequency F2 is sent and received through the air.

In contrast, a electric current having the first frequency F1, which is fed by the feeding source 128, flows from the first antenna element 124 to the second antenna element 125 through the resonant circuit 126. As a result, the monopole element 123 (in this case, the first antenna element 124 and the second antenna element 125) resonates at the first frequency F1, a signal of the first frequency F1 is sent and received through the air.

That is, the antenna 120 enables the wireless communication in the first frequency band which includes the first frequency F1, and in the second frequency band which includes the second frequency F2.

CITATION LIST

Patent Literature

[PTL 1] Japanese Patent Application Laid-Open No. 2009-147513
[PTL 2] Japanese Patent Application Laid-Open No. 1996 (H08)-186420

SUMMARY OF INVENTION

Technical Problem

In recent years, the cellular phone has a tendency to include not only a function communicating with a base station by wireless but also another function using the wireless communication (function to receive the television broadcasting, Bluetooth (Japanese registered trademark) or the like). For this reason, it is necessary that the cellular phone includes a plurality of antennas to cope with a plurality of functions which use the wireless communication. For example, the cellular phone shown in the patent literature 1 includes two antennas. One is the antenna 110 which communicates with the base station and the other is the dipole antenna 106 which receives the radio wave of the television broadcasting.

By the way, the cellular phone has almost no extra space in many cases in order to respond to the request for miniaturization. In the case, if another antenna is mounted on the cellular phone, it is necessary that the cellular phone is enlarged in order to obtain a space for mounting the antenna. That is, it is difficult to mount a new antenna on the cellular phone without enlarging the cellular phone.

In contrast, according to the antenna 120 shown in a patent literature 2, a whole of the monopole element 123 realizes the wireless communication which uses the first frequency band, and a part of the monopole element 123 (that is, the first antenna element 124) realizes the wireless communication which uses the second frequency band. That is, the monopole element 123 is applicable to both the wireless communication which uses the first frequency band and the wireless communication which uses the second frequency band. In other words, according to the configuration of the antenna 120, it is possible to avoid the enlargement of the antenna and to increase the frequency bands which can be used by the wireless communication.

However, according to the configuration of the antenna 120, it is necessary to include the dielectric substrate 122 which is used only for antenna. Furthermore, it is necessary to arrange the resonant circuit 126 on the dielectric substrate 122 which is used only for the antenna. Since the resonant circuit 126 is formed furthermore on the dielectric substrate 122, which is used only for the antenna, in addition to the antenna elements 124 and 125, number of manufacturing processes becomes increasing.

In order to solve the above-mentioned problem, the present invention is conceived. That is, a main object of the present invention is to provide an antenna, a wireless communication apparatus, and a method of configuring the antenna which can restrain the enlargement of the wireless communication apparatus and the increase of the manufacturing processes, and can increase the frequency bands which can be used by the wireless communication.

Solution to Problem

An antenna of the present invention includes:
a first ground pattern that is formed on a first printed wiring board;
a second ground pattern that is formed on a second printed wiring board on which a feeding source, which outputs an electric current of a first frequency band and a electric current of a second frequency band higher than the first frequency band, is arranged;
a hinge conductor member that is arranged on a hinge which connects indirectly the first printed wiring board and the second printed wiring board each other; and
a current control circuit that is arranged on the first printed wiring board, flows the electric current of the first frequency band, and attenuates the electric current of the second frequency band, wherein
the first ground pattern connects electrically with at least one out of a plurality of input and output ports, which the feeding source includes, through the current control circuit and the hinge conductor member,
the second ground pattern connects electrically with another input and output port of the feeding source,
the first ground pattern, the current control circuit, the hinge conductor member and the second ground pattern function as an antenna to communicate a signal of the first frequency band, and
the hinge conductor member and the second ground pattern function as an antenna to communicate a signal of the second frequency band.

A wireless communication apparatus of the present invention includes the antenna of the present invention.

A method of configuring an antenna in the present invention includes:
arranging a first ground pattern formed on a first printed wiring board,
arranging a second ground pattern formed on a second printed wiring board on which a feeding source, which outputs a electric current of a first frequency band and a electric current of a second frequency band higher than the first frequency band, is arranged;
arranging a hinge conductor member arranged on a hinge which connects indirectly the first printed wiring board and the second printed wiring board each other;
arranging a current control circuit that is arranged on the first printed wiring board, flows the electric current of the first frequency band, and attenuates the electric current of the second frequency band;
connecting electrically the first ground pattern with at least one out of a plurality of input and output ports, which the feeding source includes, through the current control circuit and the hinge conductor member; and
connecting electrically the second ground pattern with another input and output port of the feeding source, wherein
in the case of sending a signal of the first frequency band, the feeding source outputs the electric current of the first frequency band, and the electric current flows on the second ground pattern and concurrently flows on the hinge conductor member, the current control circuit and the first ground pattern, and the first ground pattern, the current control circuit, the hinge conductor member and the second ground pattern resonate in the first frequency band, and
in the case of sending a signal of the second frequency band, the feeding source outputs the electric current of the second frequency band, and the electric current flows on the second ground pattern and concurrently flows until it arrives at the current control circuit through the hinge conductor member, and a part, on which the electric current of the second frequency band flows, resonates in the second frequency band.

Advantageous Effects of Invention

According to the present invention, it is possible to restrain the enlargement of the wireless communication apparatus and the increase of the manufacturing processes, and to increase the frequency bands which can be used by the wireless communication.

DESCRIPTION OF EMBODIMENTS

An exemplary embodiment according to the present invention will be described in the following with reference to a drawing.

First Exemplary Embodiment

Figure 1A:
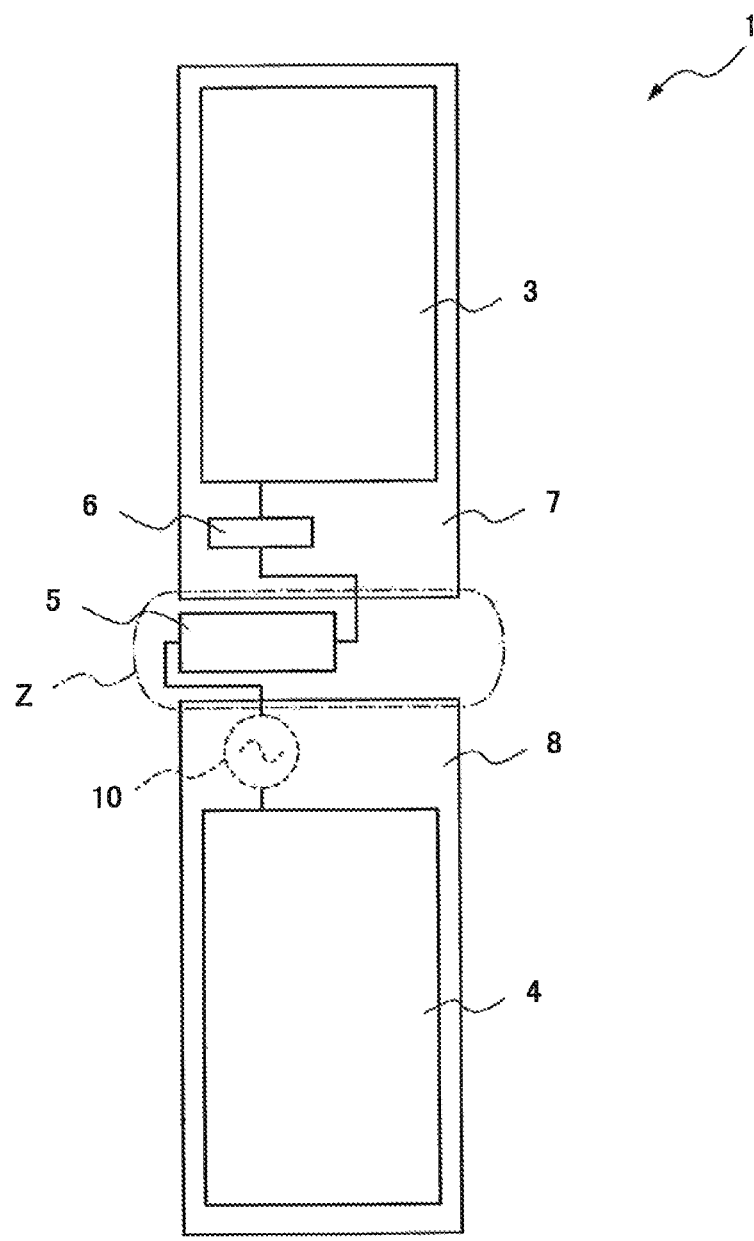
FIG. 1A is a schematic diagram showing an antenna according to a first exemplary embodiment of the present invention.

FIG. 1A is a schematic model diagram showing an antenna according to a first exemplary embodiment of the present invention. An antenna 1 according to the first exemplary embodiment includes a first ground pattern 3, a second ground pattern 4, a hinge conductor member 5 and a current control circuit 6.

That is, the first ground pattern 3 is formed on a first printed wiring board 7. The second ground pattern 4 is formed on a second printed wiring board 8. A feeding source 10 is arranged on the second printed wiring board 8. The feeding source 10 has a function to feed a electric current of a first frequency band and a electric current of a second frequency band which is higher than the first frequency band. The hinge conductor member 5 is arranged on a hinge Z which connects indirectly the first printed wiring board 7 and the second printed wiring board 8 each other. The current control circuit 6 is arranged on the first printed wiring board 7. The current control circuit 6 has a function to flow the electric current of the first frequency band and attenuate the electric current of the second frequency band.

According to the antenna 1, the first ground pattern 3 connects with the current control circuit 6. The current control circuit 6 connects with the hinge conductor member 5. Moreover, the hinge conductor member 5 connects electrically with at least one out of a plurality of input and output ports of the feeding source 10. The second ground pattern 4 connects electrically with another input and output port of the feeding source 10.

The first ground pattern 3, the current control circuit 6, the hinge conductor member 5 and the second ground pattern 4 of the antenna 1 function as an antenna which communicates a signal of the first frequency band. The hinge conductor member 5 and the second ground pattern 4 function as an antenna which communicates a signal of the second frequency band.

Figure 1B:
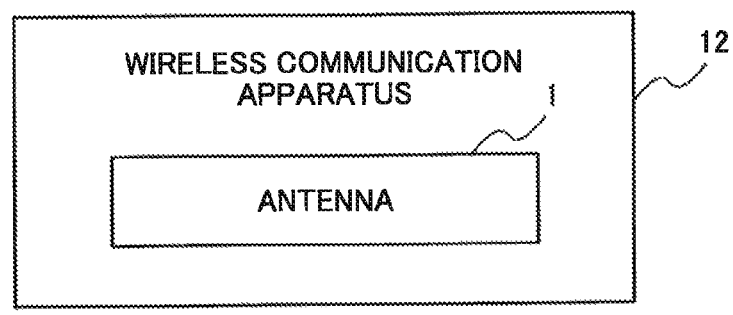
FIG. 1B is a schematic block diagram showing a wireless communication apparatus according to the first exemplary embodiment of the present invention.

The antenna 1 has the above-mentioned configuration. As shown in FIG. 1B, the antenna 1 is a constituent of a wireless communication apparatus 12.

According to the first exemplary embodiment, in the case that the antenna 1 sends the signal of the first frequency band, the feeding source 10 feeds the electric current of the first frequency band. For example, the feeding source 10 is controlled by a control unit (not shown in the figure) of the wireless communication apparatus 12. As a result, the electric current of the first frequency band flows into the second ground pattern 4, and flows into the first ground pattern 3 through the hinge conductor member 5 and the current control circuit 6. A part, on which the electric current of the first frequency band flows, resonates in the first frequency band and sends the signal of the first frequency band.

In the case that the antenna 1 sends the signal of the second frequency band, the feeding source 10 feeds the electric current of the second frequency band. For example, the feeding source 10 is controlled by the control unit (not shown in the figure) of the wireless communication apparatus 12. As a result, the electric current of the second frequency band flows into the second ground pattern 4, and flows until it arrives at the current control circuit 6 through the hinge conductor member 5. A part, on which the electric current of the second frequency band flows, resonates in the second frequency band and sends the signal of the second frequency band.

According to the antenna 1 and the wireless communication apparatus 12 which includes the antenna 1, it is possible to obtain the following effect. That is, main constituents of the antenna 1 are the first ground pattern 3 of the first printed wiring board 7, the second ground pattern 4 of the second printed wiring board 8 and the hinge conductor member 5. The main constituents are not components which are used only for the antenna and are components which can be used for the wireless communication apparatus. For this reason, it is possible to reduce a space which is used only for the antenna 1.

According to the antenna 1, a whole of the antenna has a function to send the signal of the first frequency band, and furthermore a part of the antenna has a function to send the signal of the second frequency band. That is, according to the antenna 1, it is possible to increase number of the frequency bands, which can be used by the wireless communication, without arranging another antenna.

Furthermore, according to the first exemplary embodiment, the current control circuit 6 is arranged on the printed wiring board 7. For this reason, when manufacturing the printed wiring board 7, the current control circuit 6 can be formed in the same process as one for forming another circuit on the printed wiring board 7. For this reason, according to the configuration of the antenna 1, even if the current control circuit 6 is arranged on the printed wiring board 7, it is possible to avoid increase of the manufacturing processes.

Furthermore, according to the configuration of the antenna 1, the hinge conductor member 5 is arranged on a electric current path from the feeding source 10 to the current control circuit 6. By existence of the hinge conductor member 5, it is possible to extend an electric length from the feeding source 10 to the current control circuit 6. That is, in order that the electric current path from the feeding source 10 to the current control circuit 6 functions as the antenna which communicates the signal of the second frequency band, it is necessary that the electric length of the electric current path coincides with an electric length based on a wavelength of the signal of the second frequency band. However, there is a fear that the electric length between the feeding source 10 and the current control circuit 6 may be short, since physical length between the feeding source 10 and the current control circuit 6 becomes short due to miniaturizing the wireless communication apparatus. In contrast, the hinge conductor member 5 can supplement the shortage of the electric length. As a result, the electric current path from the feeding source 10 to the current control circuit 6 can function as the antenna which communicates by the wireless of the second frequency band, even if the physical length is short.

As mentioned above, according to the antenna 1 and the wireless communication apparatus 12 which includes the antenna 1, it is possible to restrain an enlargement of the wireless communication apparatus and an increase of the manufacturing processes and to increase the frequency bands which can be used by the wireless communication.

Second Exemplary Embodiment

A second exemplary embodiment according to the present invention will be described in the following.

Figure 2:
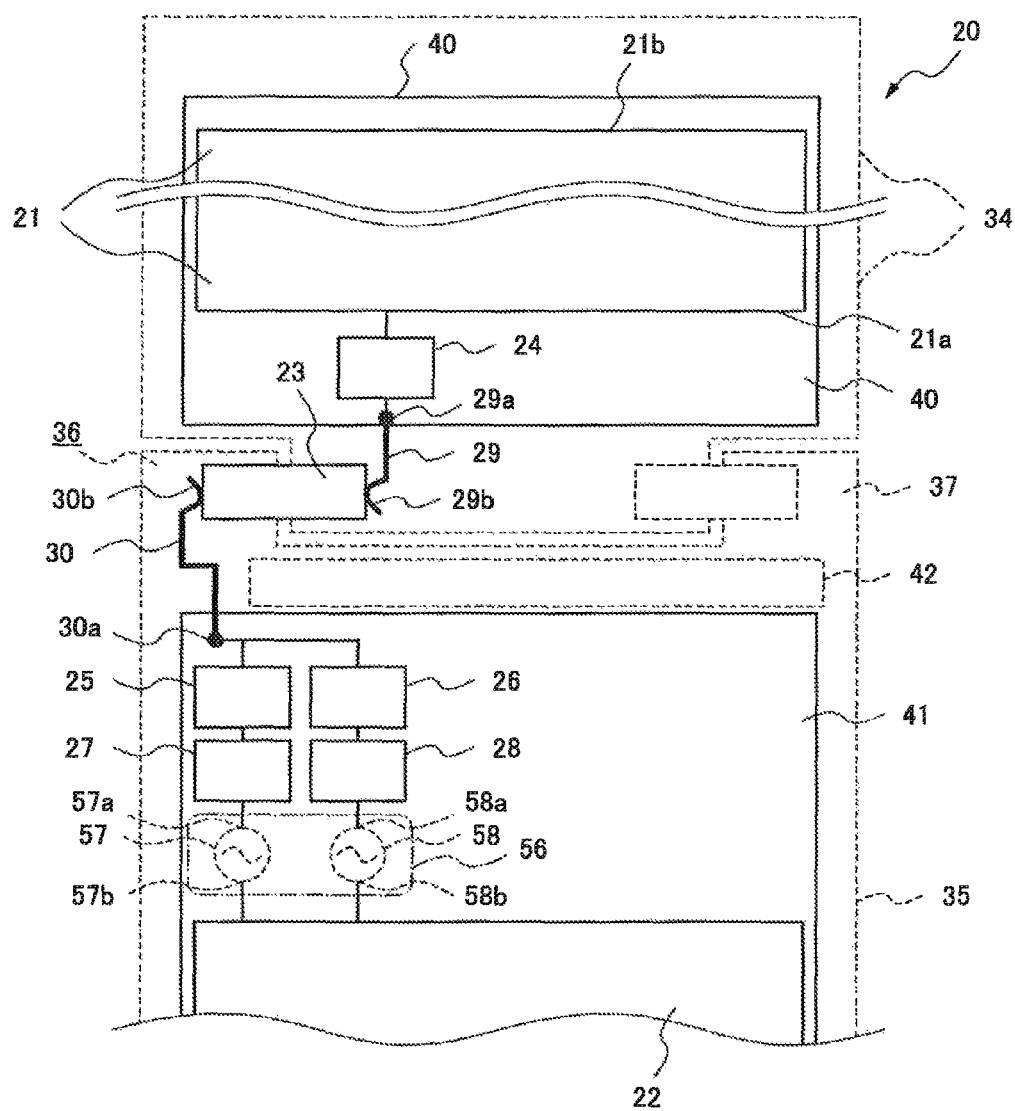
FIG. 2 is a schematic diagram showing an antenna according to a second exemplary embodiment of the present invention.

FIG. 2 shows an antenna 20 according to the second exemplary embodiment schematically. The antenna 20 includes a first ground pattern 21, a second ground pattern 22, a hinge conductor member 23 and a current control circuit 24. Furthermore, the antenna 20 includes a first feeding side current control circuit 25 (hereinafter, abbreviated as a current control circuit 25), a second feeding side current control circuit 26 (hereinafter, abbreviated as a current control circuit 26), a first impedance matching circuit 27, a second impedance matching circuit 28 and connection members 29 and 30. The antenna 20 is mounted on a folding type (clamshell type) cellular phone 32 which is a wireless communication apparatus shown in FIG. 3.

Figure 3:
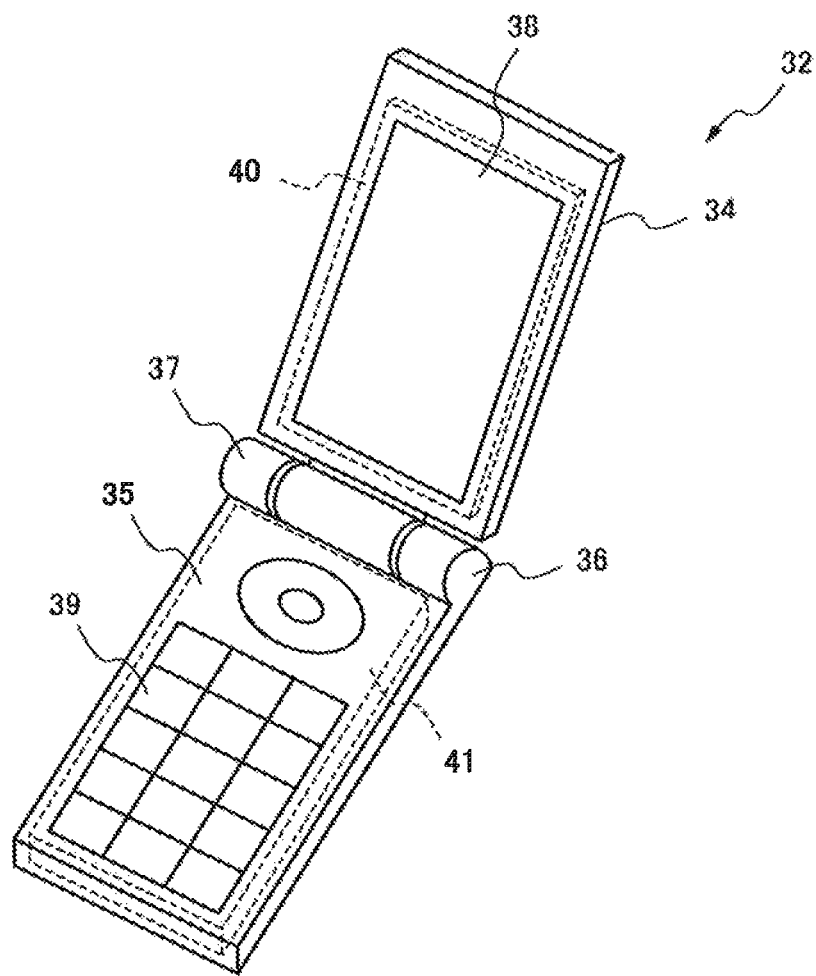
FIG. 3 is a model diagram showing an example of a wireless communication apparatus which includes the antenna according to the second exemplary embodiment of the present invention.

Here, the cellular phone 32 shown in FIG. 3 will be described simply. The cellular phone 32 includes a first case 34, a second case 35 and hinges 36 and 37. The first case 34 is equipped with a display unit 38 such as the liquid crystal display. Moreover, the first case 34 includes a first printed wiring board 40. The second case 35 is equipped with an operation unit 39 including a numerical key and a determination key. Furthermore, the second case 35 includes a second printed wiring board 41. An electric circuit (not shown in the figure), which includes a control circuit (not shown in the figure) to control the cellular phone 32, is formed on the second printed wiring board 41. An antenna 42 is mounted on a back of the second printed wiring board 41 near to the hinges 36 and 37 as shown in FIG. 2. The antenna 42 functions as an antenna which communicates with a base station by wireless. The first case 34 and the second case 35 are connected each other by the hinges 36 and 37, which are indicated by the dotted line in FIG. 2, in a state that the first case 34 and the second case 35 can turn easily around the hinges 36 and 37.

According to the antenna 20 of the second exemplary embodiment, the first ground pattern 21 is formed on the first printed wiring board 40 of the cellular phone 32, as shown in FIG. 2. The first ground pattern 21 not only functions as the ground of an electric circuit formed on the first printed wiring board 40, but also functions as a part of the antenna 20. The second ground pattern 22 is formed on the second printed wiring board 41 of the cellular phone 32. The second ground pattern 22 not only functions as the ground of the electric circuit formed on the second printed wiring board 41, but also functions as a part of the antenna 20.

By the way, a feeding source 56 of the antenna 20 is formed on the second printed wiring board 41. The feeding source 56 includes a first feeding circuit 57 and a second feeding circuit 58. The first feeding circuit 57 includes a circuit to receive a electric current (carrier) of a first frequency band. The second feeding circuit 58 includes a circuit to send and receive a electric current (carrier) of a second frequency band which is higher than the first frequency band. According to the second exemplary embodiment, the first frequency band is corresponding to, for example, a frequency band (560 MHz to 720 MHz) which is assigned to a radio wave of the ground digital television broadcasting. The second frequency band is corresponding to, for example, a frequency band (2.4 GHz to 2.5 GHz) of a radio wave which is used for the Bluetooth®.

The second ground pattern 22 connects electrically with an input and output port 57b of the first feeding circuit 57 and an input and output port 58b of the second feeding circuit 58.

According to the second exemplary embodiment, the hinge conductor member 23 is a component which is included in one of the hinges 37 and 36 (according to an example shown in FIG. 2, hinge 36) in the cellular phone 32. The hinge conductor member 23 is made of a conductor.

The current control circuit 24 is formed on the first printed wiring board 40. The current control circuit 24 has a function to flow the electric current of the first frequency band and attenuate the electric current of the second frequency band. According to the second exemplary embodiment, the current control circuit 24 includes, for example, a resonant circuit 43 shown in FIG. 4A. The resonant circuit 43 includes a capacitor 44, a coil 45 and a capacitor 47. The capacitor 44 and the coil 45, which are connected each other in parallel, form a parallel resonant circuit 46. The parallel resonant circuit 46 and the capacitor 47 are connected each other in series.

As shown in FIG. 2, one end of both ends 43a and 43b in the resonant circuit 43 connects electrically with an end part 21a on the hinge side of the first ground pattern 21. The other end of the resonant circuit 43 connects electrically with the connection member 29. Circuit parameters of the resonant circuit 43 are set so that the capacitor 44 and the coil 45 may resonate in parallel in the second frequency band, and the parallel resonant circuit 46 and the capacitor 47 may resonate in series at the first frequency band.

Figure 4A:
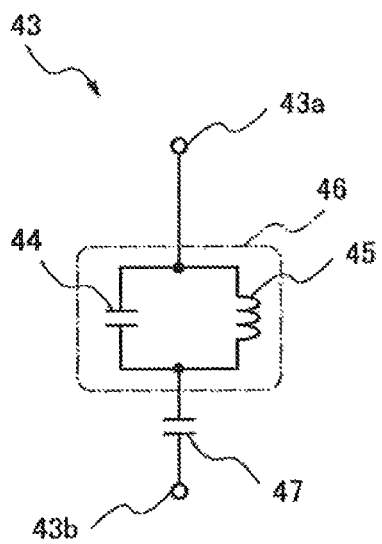
FIG. 4A is a circuit diagram showing an exemplary configuration of a resonant circuit.
Figure 4B:
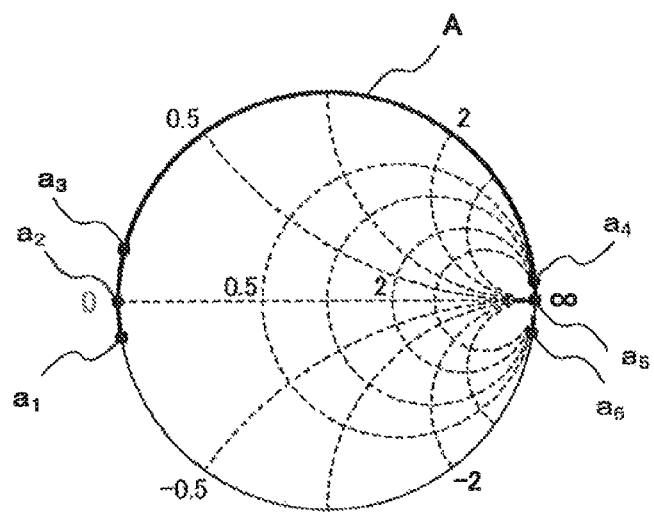
FIG. 4B is Smith Chart showing impedance characteristics of the resonant circuit shown in FIG. 4A.

As a result, the resonant circuit 43 has impedance characteristics indicated by a solid line A in FIG. 4B. That is, the solid line A in FIG. 4B represents an example of relation between a frequency (frequency which ranges from 560 MHz to the 2.5 GHz) of the electric current, which flows in the resonant circuit 43, and impedance of the resonant circuit 43 by use of Smith Chart. The solid line A extends from a point $a_1$ through a point $a_2$ to a point $a_5$ in this order along an outermost circle of Smith Chart to reach a point $a_6$. The point $a_1$, the point $a_2$, the point $a_3$, the point $a_4$, the point $a_5$, and the point $a_6$ are corresponding to 560 MHz, 640 MHz, 720 MHz, 2.4 GHz, 2.45 GHz, and 2.5 GHz respectively.

As mentioned above, the circuit parameters of the resonant circuit 43 are set so that the capacitor 44 and the coil 45 may resonate in parallel in the second frequency band, and the parallel resonant circuit 46 and the capacitor 47 may resonate in series in the first frequency band. As a result, the resonant circuit 43 is in a short or almost short state in the first frequency band (560 MHz to 720 MHz), and the resonant circuit 43 is in an open or almost open state in the second frequency band (2.4 GHz to 2.5 GHz), according to the impedance characteristics indicated by the solid line A. That is, the resonant circuit 43 flows the electric current of the first frequency band and attenuates the electric current of the second frequency band.

The connection member 29 is made of a conductor. The connection member 29 is a component which connects electrically the current control circuit 24 and the hinge conductor member 23 each other. One end 29a of the connection member 29 is fixed on the first printed wiring board 40. The fixed end 29a of the connection member 29 connects electrically with an end of the current control circuit 24 (resonant circuit 43). The other end 29b of the connection member 29 is a free end. The connection member 29 is deformed elastically. The free end 29b of the connection member 29 presses the hinge conductor member 23 by restoring force which is generated by the elastic deformation. As a result, the connection member 29 and the hinge conductor member 23 are connected each other electrically.

The connection member 30 is also made of a conductor like the connection member 29. One end 30a of the connection member 30 is fixed on the second printed wiring board 41. The other end 30b of the connection member 30 is a free end. The free end 30b of the connection member 30 presses the hinge conductor member 23 by restoring force, which is generated by the elastic deformation, like the free end 29b of the connection member 29. As a result, the connection member 30 and the hinge conductor member 23 are connected each other electrically.

The current control circuit 25 has a function to flow the electric current of the first frequency band and attenuate the electric current of the second frequency band like the current control circuit 24. According to the second exemplary embodiment, the current control circuit 25 includes the resonant circuit 43. One end (for example, end 43a) of the resonant circuit 43 connects electrically with the fixed end 30a of the connection member 30. The other end 43b of the resonant circuit 43 connects electrically with the first impedance matching circuit 27.

The current control circuit 26 has a function to flow the electric current of the second frequency band and attenuate the electric current of the first frequency band. According to the second exemplary embodiment, the current control circuit 26 has a resonant circuit 50 shown in FIG. 5A. The resonant circuit 50 includes a capacitor 51, a coil 52 and a coil 54. The capacitor 51 and the coil 52, which are connected each other in parallel, form a parallel resonant circuit 53. The parallel resonant circuit 53 and the coil 54 are connected in series. One out of both ends 50a and 50b in the resonant circuit 50 connects electrically with the fixed end 30a of the connection member 30. The other end of the resonant circuit 50 connects electrically with the second impedance matching circuit 28. Circuit parameters of the resonant circuit 50 are set so that the capacitor 51 and the coil 52 may resonate in parallel in the first frequency band, and the parallel resonant circuit 53 and the coil 54 may resonate in series in the second frequency band. As a result, the resonant circuit 50 has impedance characteristics indicated by a solid line B in FIG. 5B. That is, the solid line B in FIG. 5B indicates an example of relation between a frequency (frequency which ranges from 560 MHz to 2.5 GHz) of the electric current which flows in the resonant circuit 50, and impedance of the resonant circuit 50 by use of Smith Chart. The solid line B extends from a point $b_1$ through a point $b_2$ to a point $b_5$ in this order along an outermost circle of Smith Chart to reach a point $b_6$. The point $b_1$, the point $b_2$, the point $b_3$, the point $b_4$, the point $b_5$, and the point $a_6$ are corresponding to 560 MHz, 640 MHz, 720 MHz, 2.4 GHz, 2.45 GHz, and 2.5 GHz respectively.

As mentioned above, the circuit parameters of the resonant circuit 50 are set so that the capacitor 51 and the coil 52 may resonate in parallel in the first frequency band, and the parallel resonant circuit 53 and the coil 54 may resonate in series in the second frequency band. As a result, the resonant circuit 50 is in an open or almost open state in the first frequency band (560 MHz to 720 MHz), and the resonant circuit 50 is in a short or almost short state in the second frequency band (2.4 GHz to 2.5 GHz), as shown in the impedance characteristics indicated by the solid line B. That is, the resonant circuit 50 flows the electric current of the second frequency band and attenuates the electric current of the first frequency band.

The first impedance matching circuit 27 connects electrically with the current control circuit 25 (resonant circuit 43) as mentioned above. Moreover, the first impedance matching circuit 27 connects electrically with an input and output port 57a of the first feeding circuit 57 electrically. The first impedance matching circuit 27 has a function to match impedance of the hinge conductor member 23 (antenna side), which is seen from a connection point with the first feeding circuit 57, with impedance (for example, 50Ω) of the first feeding circuit 57 (circuit side). There are many circuit configurations of the impedance matching circuit. Any of the circuit configurations may be applicable to the first impedance matching circuit 27. Here, a description on the circuit configuration is omitted.

The second impedance matching circuit 28 connects electrically with the current control circuit 26 (resonant circuit 50) as mentioned above. Moreover, the second impedance matching circuit 28 connects electrically with an input and output port 58a of the second feeding circuit 58. The second impedance matching circuit 28 has a function to match impedance of the hinge conductor member 23 (antenna side), which is seen from a connection point with the second feeding circuit 58, with impedance (for example, 50Ω) of the second feeding circuit 58 (circuit side). Any of many configurations of the impedance matching circuit may be applicable to the second impedance matching circuit 28 like the configuration of the first impedance matching circuit 27. Here, a description on the circuit configuration is omitted.

Figure 6:
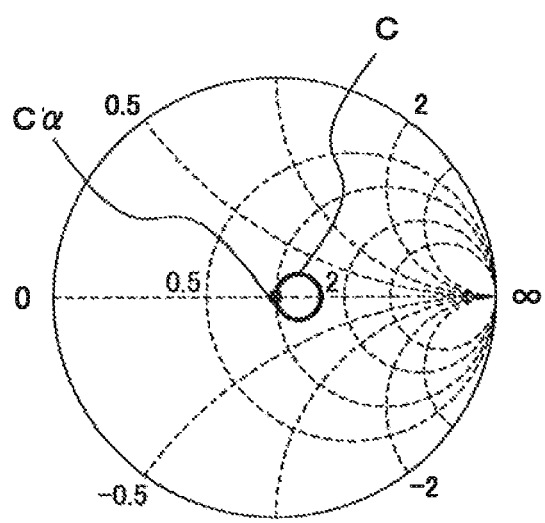
FIG. 6 is Smith Chart showing impedance characteristics in a state where a feeding source side is seen from a hinge conductor member of the antenna according to the second exemplary embodiment of the present invention.

According to the second exemplary embodiment, it is possible to match the impedance of the antenna side with the impedance of the circuit side because the above-mentioned impedance matching circuits 28 and 27 are arranged. That is, a solid line C in Smith Chart of FIG. 6 indicates impedance $Z_{56}$ which is corresponding to impedance of the feeding source 56 (circuit side) which is seen from the fixed end 30a (antenna side) of the connection member 30. This solid line C passes on a point Cα (position on the horizontal axis is 1.0). The point Cα (position on the horizontal axis is 1.0 in Smith Chart) means a point where the antenna side and the circuit side are in a state of the impedance matching. The impedance $Z_{56}$ in the first frequency band and the second frequency band is almost equal to impedance indicated by the point Cα. That is, the solid line C in FIG. 6 shows that the antenna side and the circuit side are in a state of the impedance matching in the first frequency band and the second frequency band by the impedance matching circuits 28 and 27.

According to the antenna 20 of the second exemplary embodiment, when the second feeding circuit 58 outputs the electric current of the second frequency band, the electric current of the second frequency band flows into the second ground pattern 22. Moreover, the electric current of the second frequency band flows through the second impedance matching circuit 28, the current control circuit 26, the connection member 30, the hinge conductor member 23 and the connection member 29 until reaching the current control circuit 24. The electric current of the second frequency band is attenuated by the current control circuit 24, and so stopped flowing into the first ground pattern 21.

According to the second exemplary embodiment, a part on which the electric current of the second frequency band flows is designed as follows so as to resonate in the second frequency band, and to function as a second dipole antenna. That is, an electric length of the hinge conductor member 23 or the like is designed so that an electric length of the part, on which the electric current flows, from the second feeding circuit 58 to the current control circuit 24 through the hinge conductor member 23 may correspond to an electric length which is predetermined based on a wavelength of the electric current of the second frequency band. Furthermore, according to the second exemplary embodiment, the hinge conductor member 23 out of the part, on which the electric current of the second frequency band flows, functions mainly as the second dipole antenna. As a result, a main design matter on the electric length of the second dipole antenna is to design the hinge conductor member 23. That is, a size of the hinge conductor member 23 and an interval between a connection point of the hinge conductor member 23 with the connection member 29 and a connection point of the hinge conductor member 23 with the connection member 30 (length between both ends) are designed so that the part on which the electric current of the second frequency band flows may have the predetermined length.

According to the antenna 20 of the second exemplary embodiment, in the case that the first feeding circuit 57 outputs the electric current of the first frequency band, the electric current of the first frequency band flows into the second ground pattern 22. Then, the electric current of the first frequency band reaches the hinge side end 21a of the first ground pattern 21 through the first impedance matching circuit 27, the current control circuit 25, the connection member 30, the hinge conductor member 23, the connection member 29 and the current control circuit 24 in this order. Furthermore, the electric current flows from the hinge side end 21a of the first ground pattern 21 toward the end 21b opposite to the hinge side end 21a. According to the second exemplary embodiment, the part on which the electric current flows is designed as follows so that the part may function as the first dipole antenna through resonating in the first frequency band. That is, an electric length of the first ground pattern 21 or the like is designed so that an electric length of the part, on which the electric current flows from the first feeding circuit 57 to the end 21b of the first ground pattern 21 through the hinge conductor member 23, may correspond to an electric length which is predetermined based on a wavelength of the electric current of the first frequency band.

According to the antenna 20 of the second exemplary embodiment, a part of the first dipole antenna functions as the second dipole antenna.

The antenna 20 according to the second exemplary embodiment has the above-mentioned configuration. In the case of sending a signal by wireless (in the second exemplary embodiment, sending a signal by wireless based on Bluetooth®) in the second frequency band by use of the antenna 20, the second feeding circuit 58 outputs the electric current of the second frequency band. As a result, the second dipole antenna resonates in the second frequency band. That is, it is possible to send a signal of the second frequency band by wireless through the second dipole antenna. Moreover, in the case that a radio wave (radio wave based on Bluetooth®) of the second frequency band reaches the antenna 20, the second dipole antenna resonates in the second frequency band. That is, the second dipole antenna receives the radio wave. As a result, the electric current of the second frequency band which is generated by receiving the radio wave flows from the second dipole antenna to the second feeding circuit 58.

Furthermore, in the case that a radio wave (in the second exemplary embodiment, radio wave of the ground digital television broadcasting) of the first frequency band reaches the antenna 20, the first dipole antenna resonates in the first frequency band. That is, the first dipole antenna receives the radio wave. As a result, the electric current of the first frequency band which is generated by receiving the radio wave flows from the first dipole antenna to the first feeding circuit 57.

Because the antenna 20 has the above-mentioned configuration, it is possible to obtain the following effect by virtue of the antenna 20. That is, main components of the antenna 20 are the first ground pattern 21, the second ground pattern 22 and the hinge conductor member 23. The main components 21, 22 and 23 of the antenna 20 are also components of the cellular phone (wireless communication apparatus) 32. For this reason, it is unnecessary to make a wide and dedicated space for mounting the antenna 20. As a result, it is possible to miniaturize the cellular phone 32.

Furthermore, according to the antenna 20, a part of the first dipole antenna functions as the second dipole antenna. For this reason, it is possible to increase number of the frequency bands which can use for the wireless communication without enlarging the antenna 20. That is, by using the antenna 20, it is possible to obtain an effect of miniaturizing the cellular phone 32 and increasing the number of the frequency bands which can use by wireless communication.

Furthermore, according to the antenna 20, the current control circuit 24 (resonant circuit 43) is arranged in order to function a part of the first dipole antenna as the second dipole antenna. The current control circuit 24 is formed on the first printed wiring board 40. For this reason, it is possible to manufacture the current control circuit 24 in the same process as one for manufacturing other electric circuits which are arranged on the first printed wiring board 40. As a result, it is possible to avoid increasing the processes which are dedicated for manufacturing the current control circuit 24.

Furthermore, according to the second exemplary embodiment, the hinge conductor member 23 not only functions as the constituent of the hinge but also functions as the antenna.

The hinge conductor member 23 enables the electric length to extend. For this reason, it is possible to solve the problem that the electric length of the antenna is shortage. The problem is caused due to the miniaturization of the antenna 20.

According to the antenna 20 of the second exemplary embodiment, it is possible to obtain the effect that it is possible to prevent the antenna 20 from being enlarged and the manufacturing processes from increasing and to increase the number of the frequency bands which can use the wireless communication.

Furthermore, according to the second exemplary embodiment, each of the current control circuit 24, the current control circuit 25 and the current control circuit 26 includes the resonant circuit. The resonant circuit has a function (frequency separating function) to attenuate one electric current out of the electric current of the first frequency band and the electric current of the second frequency band and to flow the other electric current. For this reason, the first dipole antenna and the second dipole antenna can function simultaneously. As a result, the antenna 20 enables, for example, to send a voice signal to a speaker or a headphone, which is far from the cellular phone 32, by wireless based on Bluetooth®, while receiving the radio wave of the ground digital television broadcasting.

The inventor has confirmed in an experimental test that it is possible to communicate by wireless with good quality through the first frequency band and the second frequency band by virtue of the antenna 20 according to the second exemplary embodiment. According to the experimental test, the inventor checks return-loss characteristics and impedance characteristics of the hinge conductor member 23 (antenna side) which is seen from the fixed end 30a of the connection member 30. Here, it is impossible to obtain an accurate result in the case that the hinge conductor member 23 (antenna side) is seen from the feeding source 56, since the resonant circuits 43 and 50 (current control circuits 25 and 26) interfere each other. For this reason, the inventor has checked, in the experimental test, the impedance characteristics of the antenna which is seen from the fixed end 30a of the connection member 30.

Figure 7A:
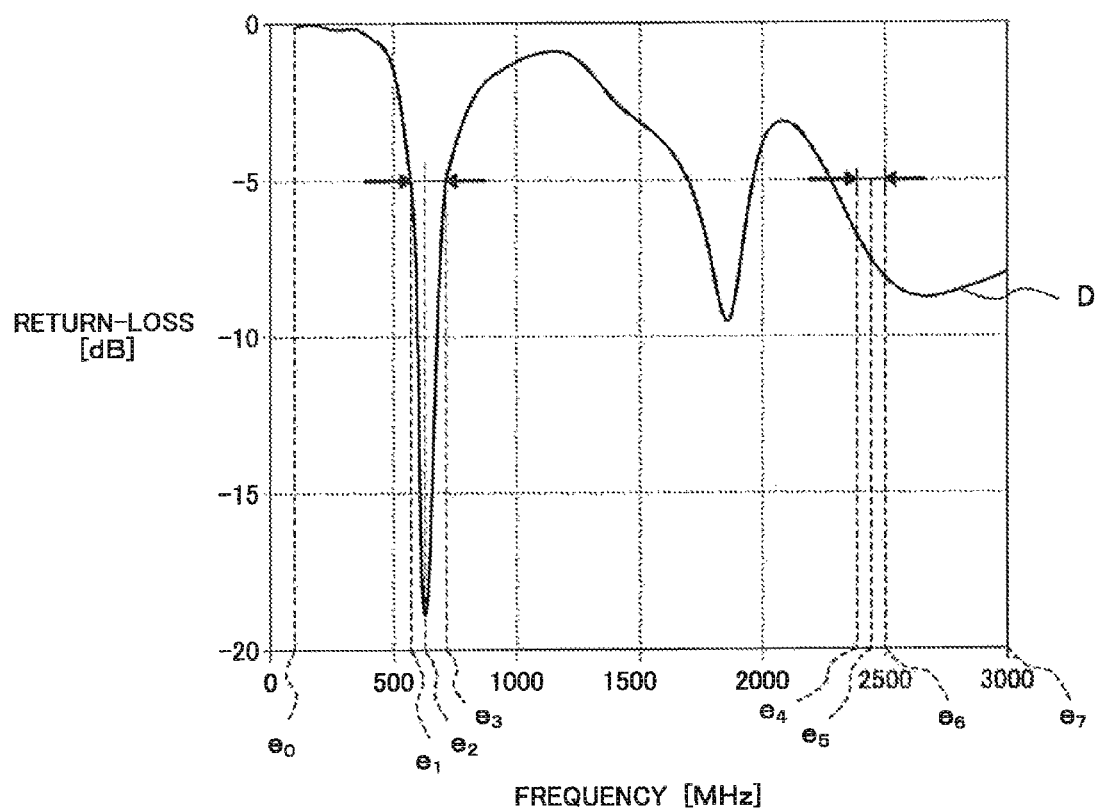
FIG. 7A is a graph showing an example of return-loss characteristics of the antenna according to the second exemplary embodiment of the present invention.
Figure 7B:
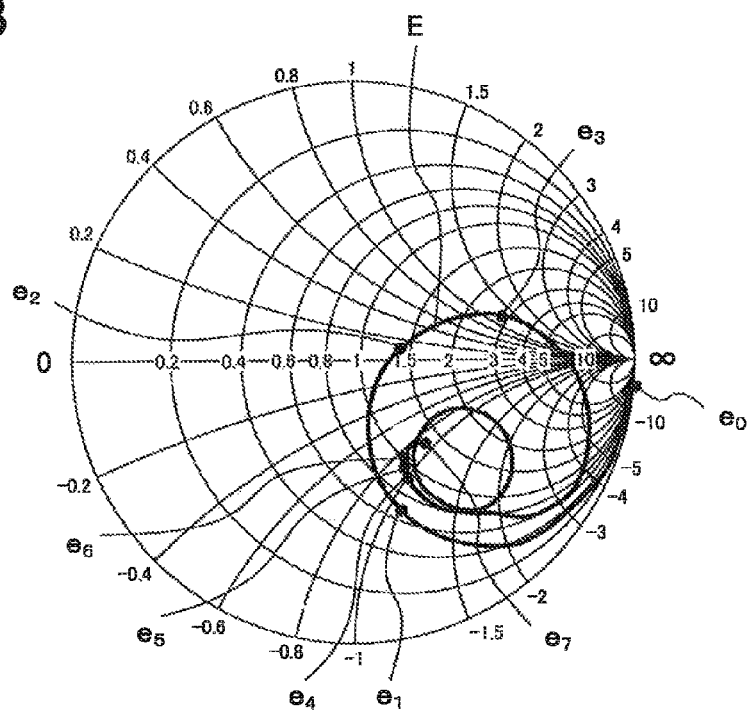
FIG. 7B is Smith Chart showing an example of impedance characteristics of the antenna according to the second exemplary embodiment of the present invention.

The return-loss characteristics obtained in the experimental test are indicated by a solid line D in FIG. 7A. Moreover, the impedance characteristics are indicated by a solid line E in Smith Chart of FIG. 7B. Here, a point $e_0$ to a point $e_7$ in FIG. 7B show impedance corresponding to frequencies $e_0$ to $e_7$ shown in FIG. 7A respectively. The frequencies $e_0$, $e_1$, $e_2$, and $e_3$ are 100 MHz, 560 MHz, 640 MHz, and 720 MHz respectively. Moreover, $e_4$, $e_5$, $e_6$ and $e_7$ are 2.4 GHz, 2.45 GHz, 2.5 GHz, and 3.0 GHz respectively.

With reference to the return-loss characteristics in FIG. 7A, the resonance in the first frequency band (560 MHz to 720 MHz) is generated by the first dipole antenna of the antenna 20. Moreover, the resonance in the second frequency band (2.4 GHz to 2.5 GHz) is generated by the second dipole of the antenna 20. Here, the resonance at 1.9 GHz in FIG. 7A is generated due to a high order resonance (third order wave) of the first dipole antenna.

Figure 8:
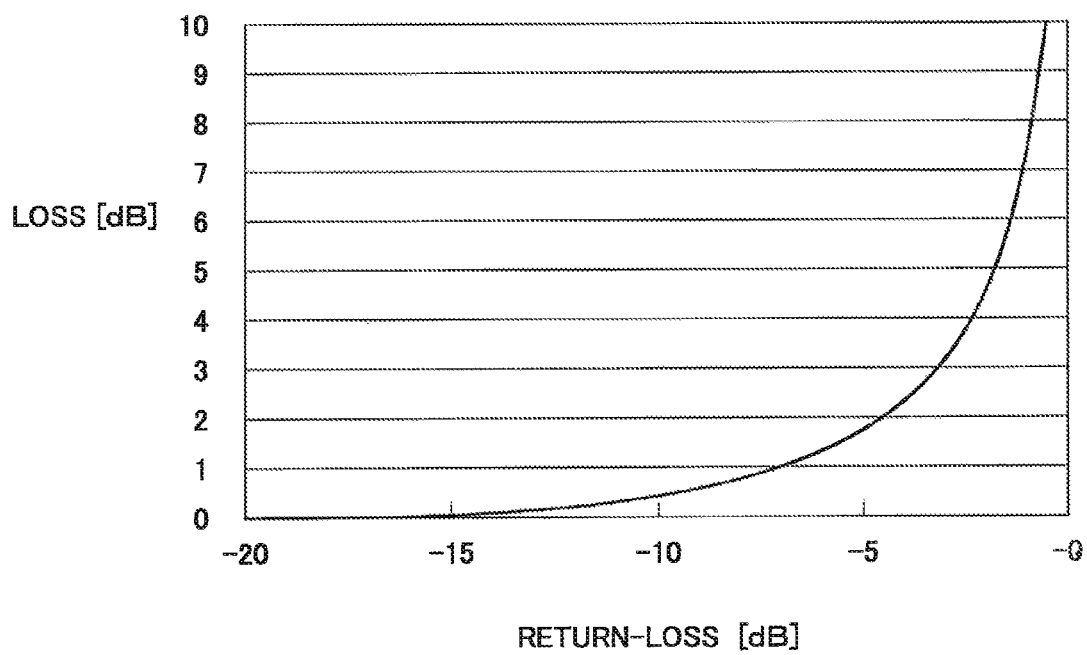
FIG. 8 shows an example of relation between return-loss and loss.

By the way, a relation between the return-loss of the antenna and the loss which causes a bad influence on a state of the wireless communication is shown in FIG. 8. In order to communicate by wireless with good quality, it is desirable generally that the return-loss is not higher than −5 dB on the basis of the relation. The above-mentioned experimental test shows that the return-loss characteristics of the antenna 20 in the first frequency band and the second frequency band are not higher than −5 dB. As a result of the experimental test, it is confirmed that both of the wireless communication in the first frequency band (wireless communication of the ground digital television broadcasting) and the wireless communication in the second frequency band (wireless communication based on Bluetooth®) can be carried out with good quality by virtue of the antenna 20.

Figure 9A:
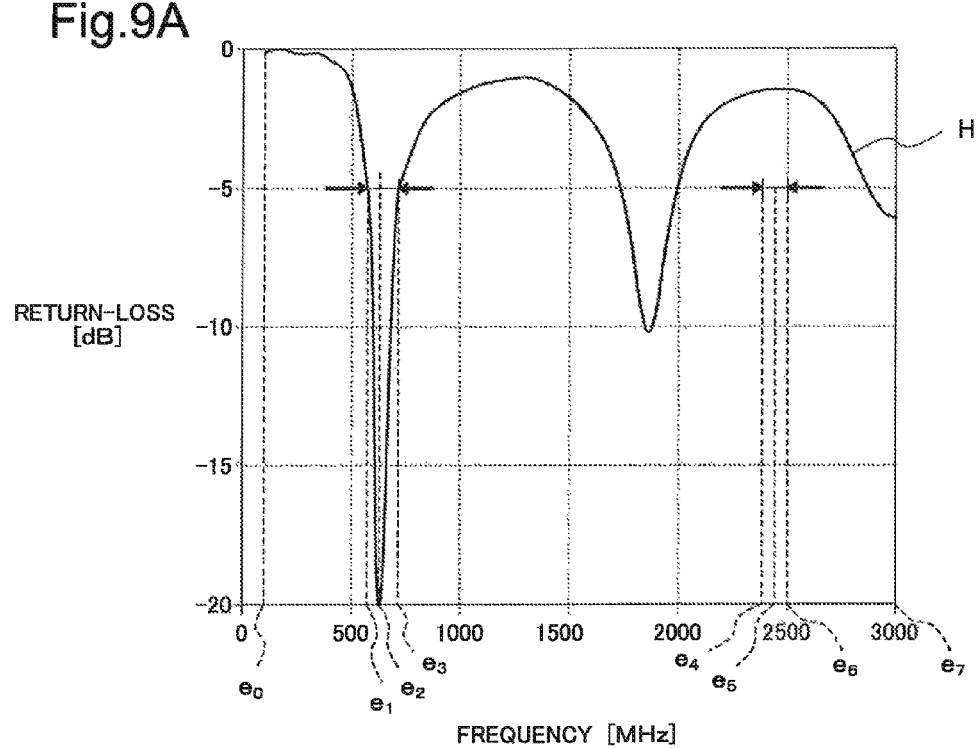
FIG. 9A is a graph showing an example of return-loss characteristics of an antenna according to a comparative example.
Figure 9B:
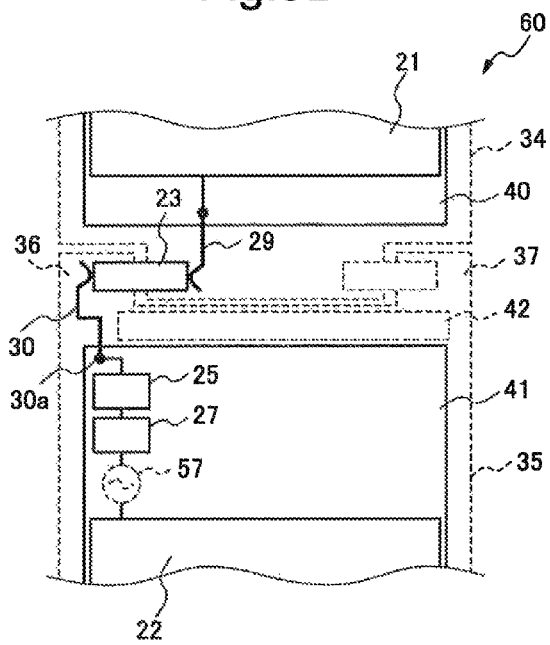
FIG. 9B is a schematic model diagram showing a configuration of the antenna according to the comparative example.
Figure 9C:
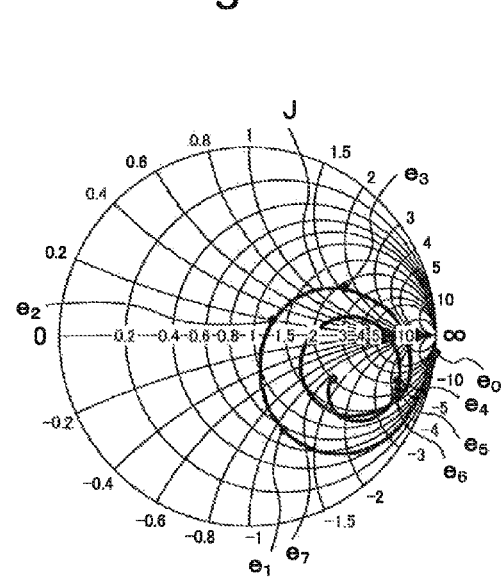
FIG. 9C is Smith Chart showing an example of impedance characteristics of the antenna according to the comparative example.

The inventor has checked the return-loss characteristics and the impedance characteristics of an antenna 60 which is a comparative example shown in FIG. 9B, in order to compare the antenna 60 with the antenna 20 according to the second embodiment. The antenna 60 as the comparative example has the same configuration as the antenna 20 according to the second exemplary embodiment except that the current control circuit 24, the current control circuit 26 and the second impedance matching circuit 28 are omitted. The return-loss characteristics of the antenna 60 as the comparative example is indicated by a solid line H in FIG. 9A. The impedance characteristics of the antenna 60 is indicated by a solid line J in FIG. 9C. Here, frequencies $e_0$ to $e_7$ shown in FIG. 9A are the same as the frequencies $e_0$ to $e_7$ in FIG. 7A respectively. A point $e_0$ to a point $e_7$ in FIG. 9C indicate impedance corresponding to the frequencies $e_0$ to $e_7$ respectively.

According to the return-loss characteristics of the antenna 60 as the comparative example, while the resonance is generated in the first frequency band (560 MHz to 720 MHz), the resonance is not generated in the second frequency band (2.4 GHz to 2.5 GHz). That is, while the antenna 60 can communicate by wireless in the first frequency band, the antenna 60 can not communicate by wireless in the second frequency band. Here, the resonance, which is generated at about 1.9 GHz in FIG. 9A, is a high order resonance (third order wave) of the first dipole antenna similar to the case of the antenna 20.

According to the return-loss characteristics of the antenna 20 in the second exemplary embodiment and the antenna 60 as the comparative example, the antenna 20 can communicate by wireless in the second frequency band, and in contrast, the antenna 60 can not communicate by wireless in the second frequency band with good quality. That is, according to the antenna 20 of the second exemplary embodiment, it is possible to obtain an effect to restrain the cellular phone 32 from being enlarged and prevent the manufacturing processes from increasing and to increase the number of the frequency bands which can use the wireless communication with good quality.

Third Exemplary Embodiment

A third exemplary embodiment according to the present invention will be described in the following.

Figure 10:
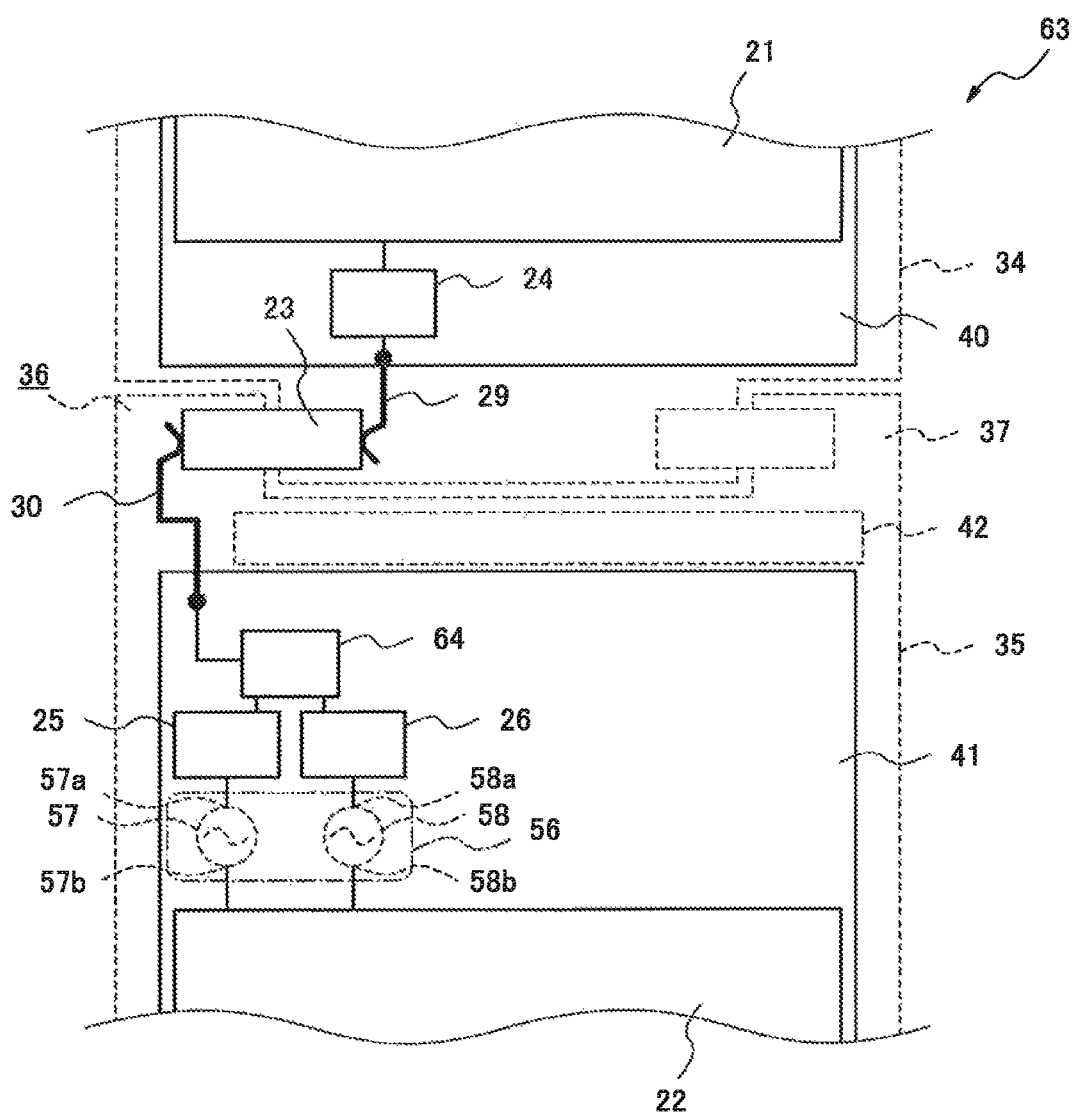
FIG. 10 is a schematic model diagram showing an antenna according to a third exemplary embodiment of the present invention.

FIG. 10 shows a main constituent of an antenna 63 according to the third exemplary embodiment. A configuration of the antenna 63 according to the third exemplary embodiment is similar to one of the antenna 20 according to the second exemplary embodiment except for a difference which will be described in the following. The difference of the antenna 63 from the antenna 20 is that the first impedance matching circuit 27 and the second impedance matching circuit 28, which are described in the second exemplary embodiment, are omitted. Furthermore, the difference of the antenna 63 from the antenna 20 is that the antenna 63 includes a common impedance matching circuit 64. In a description of the third exemplary embodiment, a part common to the part according to the second exemplary embodiment has the same reference code as the part according to the second exemplary embodiment has, and a description on the common part is omitted.

According to the third exemplary embodiment, the current control circuit 25 includes the resonant circuit 43 shown in FIG. 4A similar to the second exemplary embodiment. One end (for example, end 43b) of the resonant circuit 43 connects electrically with the input and output port 57a of the first feeding circuit 57. Moreover, the other end 43a of the resonant circuit 43 connects electrically with the common impedance matching circuit 64.

Figure 5A:
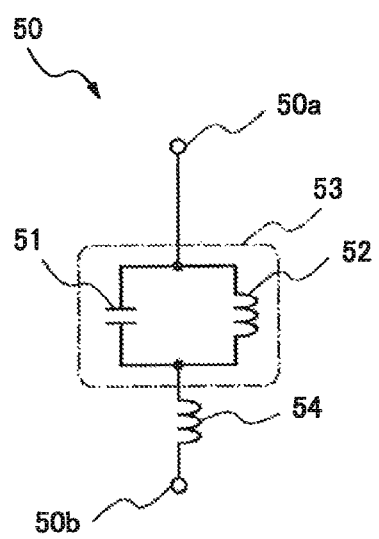
FIG. 5A is a circuit diagram showing an exemplary configuration of another resonant circuit.
Figure 5B:
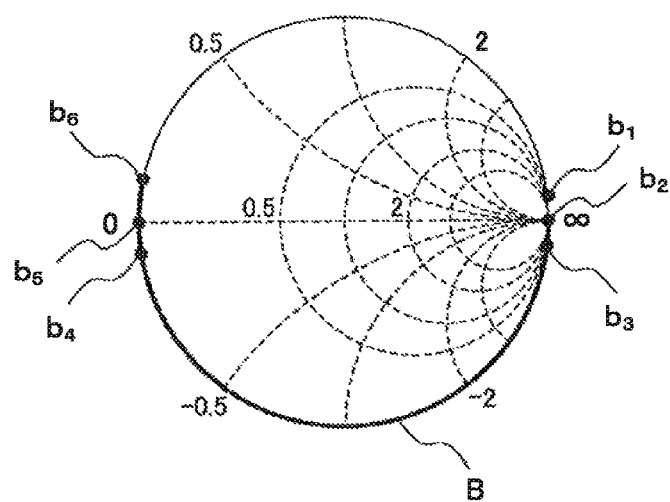
FIG. 5B is Smith Chart showing impedance characteristics of the resonant circuit shown in FIG. 5A.

The current control circuit 26 according to the third exemplary embodiment includes the resonant circuit 50 shown in FIG. 5A similarly to the second exemplary embodiment. One end (for example, end 50b) of the resonant circuit 50 connects electrically with the input and output port 58a of the second feeding circuit 58. Moreover, the other end 50a of the resonant circuit 50 connects electrically with the common impedance matching circuit 64.

The common impedance matching circuit 64 matches the impedance of the hinge conductor member 23 side (antenna side) with the impedance of the feeding source 56 side (circuit side). There are many circuit configurations of the impedance matching circuit, as mentioned above. Any of the circuit configurations may be applicable to the common impedance matching circuit 64. A description on the circuit configuration is omitted.

Main constituents of the antenna 63 (first ground pattern 21, second ground pattern 22, hinge conductor member 23 and current control circuit 24) according to the third exemplary embodiment are similar to ones of the antenna 20 according to the second exemplary embodiment. For this reason, according to the antenna 63 of the third exemplary embodiment, similar to the antenna 20 of the second exemplary embodiment, it is possible to obtain an effect to restrain the enlargement and prevent the manufacturing processes from increasing and to increase the number of the frequency bands which can use by wireless communication.

Moreover, according to the third exemplary embodiment, the first impedance matching circuit 27 and the second impedance matching circuit 28 are omitted, and the common impedance matching circuit 64 is arranged in stead. For this reason, it is possible that the antenna 63 according to the third exemplary embodiment has the simpler circuit configuration than the antenna 20 according to the second embodiment has.

Other Exemplary Embodiment

Figure 11:
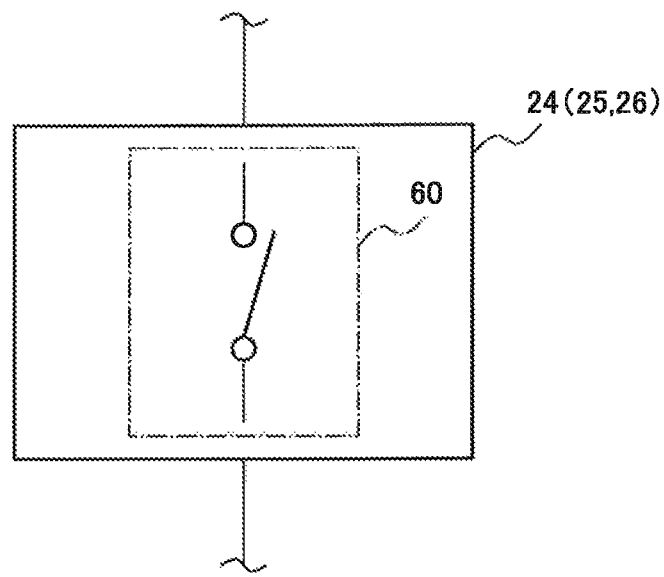
FIG. 11 shows another exemplary configuration of a current control circuit.
Figure 12A:
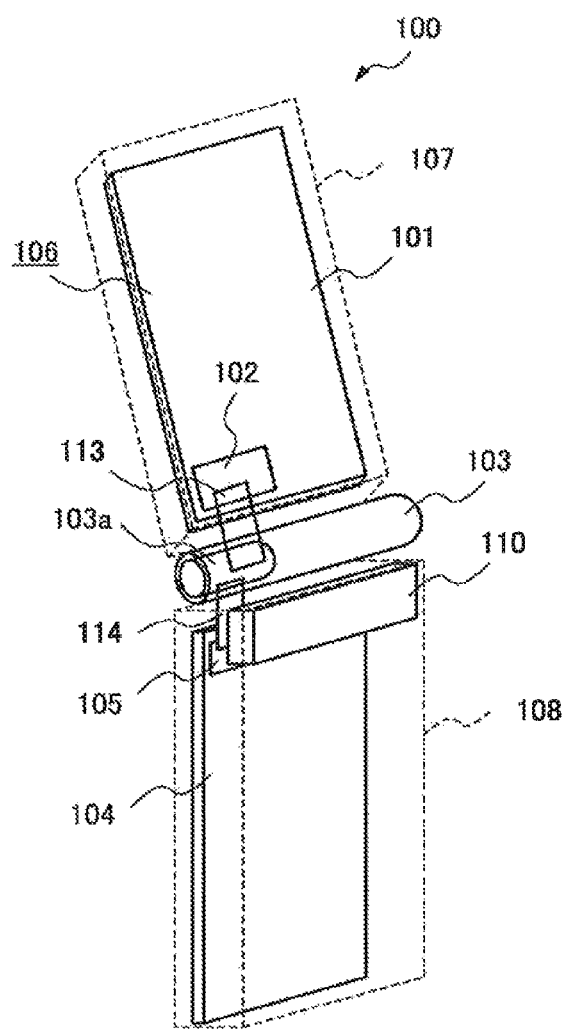
FIG. 12A is a schematic model diagram showing an antenna described in a patent literature 1.
Figure 12B:
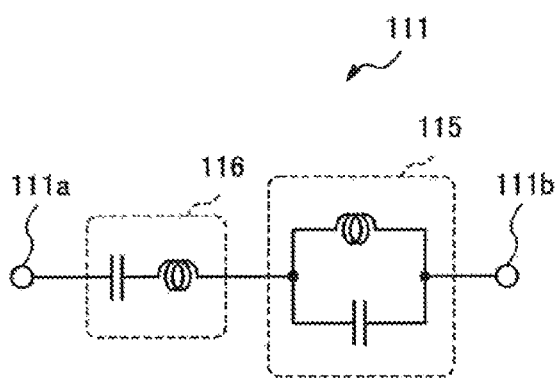
FIG. 12B is a circuit diagram showing an exemplary circuit configuration of an impedance element which is included in the antenna described in the patent literature 1.
Figure 13A:
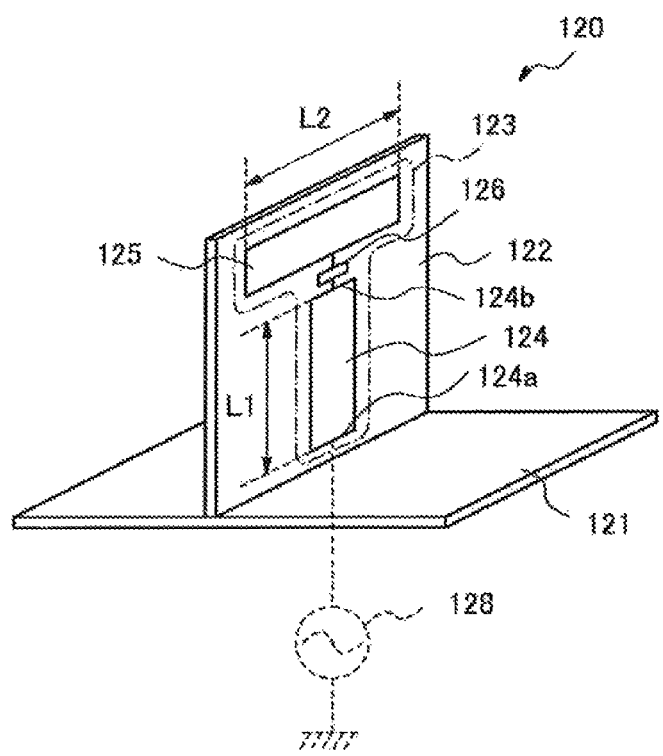
FIG. 13A is a schematic model diagram showing an antenna described in a patent literature 2.
Figure 13B:
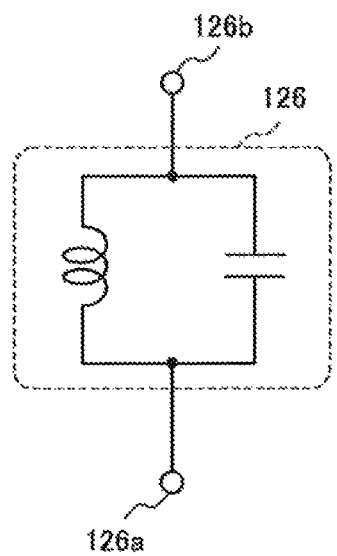
FIG. 13B is a circuit diagram showing an exemplary circuit configuration of a resonant circuit which is included in the antenna described in the patent literature 2.

The present invention is not limited to the first to the third exemplary embodiments, and the various exemplary embodiments can be adopted. For example, while the current control circuit 24 controls the electric current to flow and to attenuate by use of the resonant circuit according to the second and the third exemplary embodiments, the current control circuit 24 may have a configuration to control the electric current to flow and to attenuate with no use of the resonant circuit. For example, the current control circuit 24 may have a configuration to control the electric current to flow and to attenuate by use of a switching circuit 60 shown in FIG. 11. For example, a switching circuit which uses a transistor such as FET (Field Effect Transistor), and a switching circuit which uses a diode such as the pin (p-intrinsic-n) diode are exemplified as the switching circuit. A function of such switching circuit is controlled as follows, for example, by a control circuit (not shown in the figure) which controls an operation of the cellular phone 32. That is, in the case of communicating by wireless in the first frequency band (in the case of flowing the electric current of the first frequency band into the first ground pattern 21), the control circuit controls the switching circuit to enter into an ON state. Moreover, in the case of communicating by wireless in the second frequency band (in the case that the current control circuit 24 attenuates the electric current of the second frequency band), the control circuit controls the switching circuit to enter into an OFF state.

In the case that the current control circuit 24 includes the switching circuit as mentioned above, the antennas 20 and 63 communicate by wireless in only one frequency band which is selected out of the first frequency band and the second frequency band based on the state of the switching circuit. For this reason, in the case that the current control circuit 24 includes the switching circuit, either or both of the current control circuit 25 and the current control circuit 26 may be configured so as to include not the resonant circuit but the switching circuit. The function of the switching circuit is controlled, for example, by the control circuit (not shown in the figure) of the cellular phone 32.

Moreover, while the hinge conductor member 23 is one constituent of the hinge 36 according to the second and the third exemplary embodiments, an antenna element, which is formed on a dielectric component included in the hinge 36, may be used instead of the hinge conductor member 23. In this case, since it is possible to adjust the electric length of the antenna element more easily, it is possible to set the predetermined electric length of the second dipole antenna with higher accuracy.

Furthermore, according to the second and the third exemplary embodiments, the cellular phone 32 is exemplified as the example of the wireless communication apparatus on which the antennas 20 and 63 are mounted. However, the wireless communication apparatus, which includes the antenna according to the present invention, is not limited to the cellular phone 32. For example, a mobile information terminal such as PDA (Personal Digital Assistant), in which the hinge is arranged, is exemplified as another example of the wireless communication apparatus on which the antenna according to the present invention is arranged.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2009-215824, filed on Sep. 17, 2009, the disclosure of which is incorporated herein in its entirety by reference.

INDUSTRIAL APPLICABILITY

The present invention is effective in an antenna which communicates by use of a plurality of frequency bands, and a wireless communication apparatus which uses the antenna.

REFERENCE SIGNS LIST 1, 20 and 63 Antenna
3 and 21 First ground pattern
4 and 22 Second ground pattern
5 and 23 Hinge conductor member
6 and 24 Current control circuit
25 First feeding side current control circuit (current control circuit)
26 Second feeding side current control circuit (current control circuit)
27 First impedance matching circuit
28 Second impedance matching circuit
43 and 50 Resonant circuit

The invention claimed is:
1. An antenna, comprising:
a first ground pattern that is formed on a first printed wiring board;
a second ground pattern that is formed on a second printed wiring board on which a feeding source, which outputs an electric current of a first frequency band and a electric current of a second frequency band higher than the first frequency band, is arranged;
a hinge conductor member that is arranged on a hinge which connects indirectly the first printed wiring board and the second printed wiring board each other; and
a current control circuit that is arranged on the first printed wiring board, flows the electric current of the first frequency band, and attenuates the electric current of the second frequency band, wherein
the first ground pattern connects electrically with at least one out of a plurality of input and output ports, which the feeding source includes, through the current control circuit and the hinge conductor member,
the second ground pattern connects electrically with another input and output port of the feeding source,
the first ground pattern, the current control circuit, the hinge conductor member and the second ground pattern function as an antenna to communicate a signal of the first frequency band, and
the hinge conductor member and the second ground pattern function as an antenna to communicate a signal of the second frequency band.

2. The antenna according to claim 1, wherein
the current control circuit includes a resonant circuit that is in a short or almost short state for the electric current of the first frequency band, and in an open or almost open state for the electric current of the second frequency band.

3. The antenna according to claim 1, wherein
the current control circuit includes a switching circuit that switches selectively between a state flowing the electric current and a state attenuating the electric current.

4. The antenna according to claim 1, further comprising:
a first feeding side current control circuit that is arranged on the second printed wiring board, flows the electric current of the first frequency band and attenuates the electric current of the second frequency band; and
a second feeding side current control circuit that is arranged on the second printed wiring board, flows the electric current of the second frequency band and attenuates the electric current of the first frequency band, wherein
the hinge conductor member connects with the input and output port, which is corresponding to inputting and outputting the electric current of the first frequency band in the feeding source, through the first feeding side current control circuit, and connects with the input and output port, which is corresponding to inputting and outputting the electric current of the second frequency band in the feeding source, through the second feeding side current control circuit.

5. The antenna according to claim 4, wherein
the first feeding side current control circuit includes a resonant circuit which is in a short or almost short state for the electric current of the first frequency band, and in an open or almost open state for the electric current of the second frequency band, and
the second feeding side current control circuit includes a resonant circuit which is in an open or almost open state for the electric current of the first frequency band, and in a short or almost short state for the electric current of the second frequency band.

6. The antenna according to claim 4, wherein
at least one out of the first feeding side current control circuit and the second feeding side current control circuit includes a switching circuit that switches selectively between a state flowing the electric current and a state attenuating the electric current.

7. The antenna according to claim 4, further comprising:
a first impedance matching circuit that is arranged on a electric current path connecting the hinge conductor member electrically with the feeding source through the first feeding side current control circuit, and matches an impedance of the feeding source side and an impedance of the hinge conductor member side; and
a second impedance matching circuit that is arranged on a electric current path connecting the hinge conductor member electrically with the feeding source through the second feeding side current control circuit, and matches an impedance of the feeding source side and an impedance of the hinge conductor member side.

8. The antenna according to claim 4, further comprising:
a common impedance matching circuit that matches an impedance of the feeding source side and an impedance of the hinge conductor member side.

9. The antenna according to claim 4, wherein
the hinge conductor member includes an antenna element, one of both ends of the antenna element connects electrically with the feeding source, and the other connects electrically with the current control circuit.

10. A wireless communication apparatus that includes an antenna according to claim 1.

11. A method of configuring an antenna, comprising:
arranging a first ground pattern formed on a first printed wiring board;
arranging a second ground pattern formed on a second printed wiring board on which a feeding source, which outputs a electric current of a first frequency band and a electric current of a second frequency band higher than the first frequency band, is arranged;
arranging a hinge conductor member arranged on a hinge which connects indirectly the first printed wiring board and the second printed wiring board each other;
arranging a current control circuit that is arranged on the first printed wiring board, flows the electric current of the first frequency band, and attenuates the electric current of the second frequency band;
connecting electrically the first ground pattern with at least one out of a plurality of input and output ports, which the feeding source includes, through the current control circuit and the hinge conductor member; and
connecting electrically the second ground pattern with another input and output port of the feeding source, wherein
in the case of sending a signal of the first frequency band, the feeding source outputs the electric current of the first frequency band, and the electric current flows on the second ground pattern and concurrently flows on the hinge conductor member, the current control circuit and the first ground pattern, and the first ground pattern, the current control circuit, the hinge conductor member and the second ground pattern resonate in the first frequency band, and
in the case of sending a signal of the second frequency band, the feeding source outputs the electric current of the second frequency band, and the electric current flows on the second ground pattern and concurrently flows until it arrives at the current control circuit through the hinge conductor member, and a part, on which the electric current of the second frequency band flows, resonates in the second frequency band.

\* \* \* \* \*

UNITED STATES PATENT AND TRADEMARK OFFICE
CERTIFICATE OF CORRECTION

PATENT NO. : 8,681,062 B2
APPLICATION NO. : 13/496789
DATED : March 25, 2014
INVENTOR(S) : Ryoh Itoh and Jun Uchida It is certified that error appears in the above-identified patent and that said Letters Patent is hereby corrected as shown below:

In the Specification

Column 11, Line 23: Delete "$a_6$" and insert -- $b_6$ --

Signed and Sealed this
Second Day of December, 2014

Michelle K. Lee
*Deputy Director of the United States Patent and Trademark Office*